(12) United States Patent
Nelson et al.

(10) Patent No.: US 11,584,903 B2
(45) Date of Patent: Feb. 21, 2023

(54) STRUCTURED UNIT DOSE CLEANSING PRODUCT

(71) Applicant: Lubrizol Advanced Materials, Inc., Cleveland, OH (US)

(72) Inventors: Andrew P. Nelson, Flintshire (GB); Yunpeng Zhu, Fair Lawn, NJ (US); Feng-Lung Gordon Hsu, Broadview Hts., OH (US); Krishnan Tamareselvy, Somerset, NJ (US); Sinan Li, Hudson, OH (US); Kristia A. Rivera, Elizabeth, NJ (US); Steven Carbone, Flintshire (GB); Gary A. Russo, Willoughby, OH (US); John Uhran, Wickliffe, OH (US); David Michael Pehar, Willoughby, OH (US); Jess Carlson, Chagrin Falls, OH (US); Trevor L. Jackson, Kirtland, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 216 days.

(21) Appl. No.: 16/753,380

(22) PCT Filed: Oct. 5, 2018

(86) PCT No.: PCT/US2018/054681
§ 371 (c)(1),
(2) Date: Apr. 3, 2020

(87) PCT Pub. No.: WO2019/071174
PCT Pub. Date: Apr. 11, 2019

(65) Prior Publication Data
US 2020/0277554 A1    Sep. 3, 2020

Related U.S. Application Data

(60) Provisional application No. 62/568,446, filed on Oct. 5, 2017.

(51) Int. Cl.
*C11D 1/02* (2006.01)
*C11D 3/37* (2006.01)
(Continued)

(52) U.S. Cl.
CPC .......... *C11D 17/0082* (2013.01); *B33Y 70/10* (2020.01); *B33Y 80/00* (2014.12);
(Continued)

(58) Field of Classification Search
CPC ......... C11D 1/02; C11D 3/2079; C11D 3/222; C11D 3/3707; C11D 3/3726; C11D 3/3753; C11D 3/3788; C11D 17/042
See application file for complete search history.

(56) References Cited

U.S. PATENT DOCUMENTS

| 4,404,296 A | 9/1983 | Dietmar |
| 5,817,609 A | 10/1998 | He et al. |

(Continued)

FOREIGN PATENT DOCUMENTS

WO    2010023043 A1    3/2010

*Primary Examiner* — Brian P Mruk
(74) *Attorney, Agent, or Firm* — Christopher P. Demas; Michael A. Miller

(57) ABSTRACT

The disclosed technology relates to a formulation for a unit does cleansing product without the use of a film package, which contains a basic cleansing composition and a structurant comprising C6-C30 fatty acid or mixtures thereof and at least one water soluble polymer or water dispersible polymer.

7 Claims, 5 Drawing Sheets

(51) Int. Cl.
*C11D 17/00* (2006.01)
*B33Y 80/00* (2015.01)
*B33Y 70/10* (2020.01)
*C11D 3/20* (2006.01)
*C11D 3/22* (2006.01)
*C11D 10/04* (2006.01)

(52) U.S. Cl.
CPC ............ *C11D 3/2079* (2013.01); *C11D 3/222* (2013.01); *C11D 3/3707* (2013.01); *C11D 3/3726* (2013.01); *C11D 3/3753* (2013.01); *C11D 3/3788* (2013.01); *C11D 10/04* (2013.01)

(56) References Cited

U.S. PATENT DOCUMENTS

| | | |
|---|---|---|
| 5,916,856 A | 6/1999 | Massaro et al. |
| 6,808,598 B1 | 10/2004 | Takeuchi et al. |
| 8,889,610 B2 | 11/2014 | Labeque et al. |
| 2001/0011067 A1 | 8/2001 | Stewart et al. |
| 2015/0057210 A1* | 2/2015 | Labeque ................ C11D 10/04 264/4 |

* cited by examiner

STRUCTURED UNIT DOSE CLEANSING PRODUCT

CROSS REFERENCE TO RELATED APPLICATION

This application claims priority from PCT Application Serial No. PCT/US2018/054681 filed on Oct. 5, 2018, which claims the benefit of U.S. Provisional Application No. 62/568,446 filed on Oct. 5, 2017, the entirety of which is hereby incorporated by reference.

BACKGROUND OF THE INVENTION

The disclosed technology relates to a formulation for a unit dose cleansing product without the use of a film package, which contains a basic cleansing composition and a structurant.

There are many innovations in the cleansing market to provide consumers convenient and attractive products that are also effective cleansers. In recent years, unit dose cleansing products, such pod detergents, have attracted much attention from consumers. Unit dose pod products exhibit advantages over old unit dose detergent tablet in terms of better water solubility, better handling, less dust and fine particles, and friability. Pod cleansing products use a bag into which a cleansing composition is packed. The bag is made of a water soluble film that has a high viscosity when exposed to water.

The pod cleansing products can be colorful and attractive to children who mistake the pod as a toy or candy and play with or even eat the pods. Because of the highly concentrated liquid detergent within the pod, and the sticky film in which the pod is packaged, it has been reported that young children suffered from eye burns and choking. A safer product is needed.

Furthermore, the manufacturing of pod detergents results in a high level of waste from defectively wrapped pods, allowing leakage of detergent, or from the excessive amount of film trimmed from the pods that cannot be re-used.

Also, pod detergent have a fixed dosage and the consumer cannot control the amount of detergent usage.

A new unit dose cleansing product is needed.

SUMMARY OF THE INVENTION

The disclosed technology, therefore, solves the problem of safety, waste, and control by providing a unit dose formulation that does not require packaging in a film.

One aspect of the disclosed technology is directed to a structured unit dose dissolvable article. The structured unit dose dissolvable article contains a cleansing composition and a structurant composition.

In an embodiment, the structurant composition includes a $C_6$ to $C_{30}$ fatty acid or mixtures thereof, and at least one water soluble or water dispersible polymer.

In an embodiment, the water soluble or water dispersible polymer can be a polymer including monomer units derived from a poly(alkylene) glycol, such as, for example, poly(ethylene) glycol.

In some embodiments, the water soluble or water dispersible polymer can be a polyethylene glycol polymer having a number average molecular weight of from about 200 to about 1,000,000.

In some embodiments, the water soluble or water dispersible polymer can be an ethylene oxide-propylene oxide-butylene oxide block copolymer.

In some embodiments, the water soluble or water dispersible polymer can be a substituted oligo or polysaccharide, wherein the substituent is derived from poly(ethylene) glycol.

In some embodiments, the water soluble or water dispersible polymer can be a poly(vinyl) alcohol, poly(vinyl)pyrolidones, poly(acrylamide) or combinations thereof.

In some embodiments, the water soluble or water dispersible polymer can be an alkoxylated polyol polymer, such as, for example, polyethylene glycol methyl glucose polymer having from 2 to 1000 moles of polyethylene glycol per mole of methyl glucose. In some embodiments, the alkoxylated polyol polymer can be further derivatized with a lipophilic reagent, such as a mono- or di-alkyl $C_3$ to $C_{60}$ fatty acid.

In some embodiments, the water soluble or water dispersible polymer can be a polyethylene glycol based polyurethane. In embodiments, the polyurethane additionally include units derived from, polyester polyol, polyether polyol, polycaprolactone diol, polybutadiene polyol and their mixtures; and end-capped polyurethanes.

Another aspect of the disclosed technology includes a process of preparing a structured unit dose dissolvable article by mixing a cleansing composition with a structurant composition and forming the mixture into the structured unit dose dissolvable article.

In an embodiment, the structured unit dose dissolvable article can be formed by molding the mixture, such as, for example, vacuum molding, injection molding, or compression molding.

In some embodiments, forming the structured unit dose dissolvable article can occur by sculpting the mixture, such as through a 3D printing, or by traditional sculpting of discreet amounts of the mixture on a surface, allowing the mixture to dry and harden, and sculpting the hardened mixture into the desired shape.

In embodiment, the structured unit dose dissolvable article can be formed by extruding the mixture into a desired shape, or by die cutting the mixture.

DETAILED DESCRIPTION OF THE INVENTION

Figure 1:
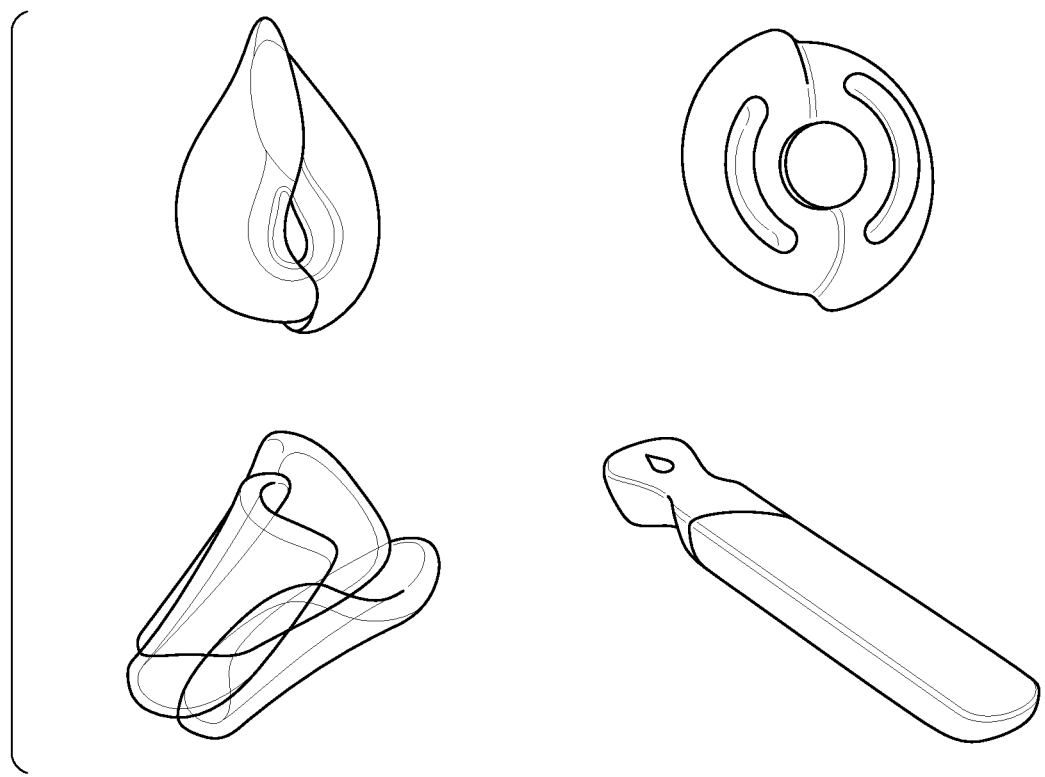
FIG. 1 provides examples of molded structured unit dose dissolvable articles.

Various preferred features and embodiments will be described below by way of non-limiting illustration.

One aspect of this disclosure is an article that dissolves on contact with an aqueous medium to deliver a cleansing composition to the medium. The structured unit dose dissolvable article contains the cleansing composition and a structurant composition that allows the composition to be structured into an article.

Cleansing compositions, in general, are known in the art and are not particularly limited herein. Basic cleansing compositions include, for example, a detersive surfactant composition. Detersive surfactants utilized to formulate the cleansing compositions can include, for example, anionic surfactants, amphoteric surfactants, nonionic surfactants, and mixtures thereof.

Non-limiting examples of anionic surfactants are disclosed in McCutcheon's Detergents and Emulsifiers, North American Edition, 1998, published by Allured Publishing Corporation; and McCutcheon's, Functional Materials, North American Edition (1992); both of which are incorporated by reference herein in their entirety. The anionic surfactant can be any of the anionic surfactants known or previously used in the art of aqueous surfactant compositions. Suitable anionic surfactants include but are not limited to alkyl sulfates, alkyl ether sulfates, alkyl sulphonates, alkaryl sulfonates, α-olefin-sulphonates, alkylamide sulphonates, alkarylpolyether sulphates, alkylamidoether sulphates, alkyl monoglyceryl ether sulfates, alkyl monoglyceride sulfates, alkyl monoglyceride sulfonates, alkyl succinates, alkyl sulfosuccinates, alkyl sulfosuccinamates, alkyl ether sulphosuccinates, alkyl amidosulfosuccinates; alkyl sulphoacetates, alkyl phosphates, alkyl ether phosphates, alkyl ether carboxylates, alkyl amidoethercarboxylates, N-alkylamino acids, N-acyl amino acids, alkyl peptides, N-acyl taurates, alkyl isethionates, carboxylate salts wherein the acyl group is derived from fatty acids; and the alkali metal, alkaline earth metal, ammonium, amine, and triethanolamine salts thereof.

In one aspect, the cation moiety of the forgoing salts is selected from sodium, potassium, magnesium, ammonium, mono-, di- and triethanolamine salts, and mono-, di-, and tri-isopropylamine salts. The alkyl and acyl groups of the foregoing surfactants contain from about 6 to about 24 carbon atoms in one aspect, from 8 to 22 carbon atoms in another aspect and from about 12 to 18 carbon atoms in a further aspect and can be saturated or unsaturated. The aryl groups in the surfactants are selected from phenyl or benzyl. The ether containing surfactants set forth above can contain from 1 to 20 ethylene oxide and/or propylene oxide units per surfactant molecule in one aspect, and from 1 to 10, 1 to 6 or 1 to 3 ethylene oxide units per surfactant molecule in another aspect.

Examples of suitable anionic surfactants include but are not limited to the sodium, potassium, lithium, magnesium, and ammonium salts of laureth sulfate, trideceth sulfate, myreth sulfate, $C_{12}$-$C_{13}$ pareth sulfate, $C_{12}$-$C_{14}$ pareth sulfate, and $C_{12}$-$C_{15}$ pareth sulfate, ethoxylated with 1, 2, 3, 4 or 5 moles of ethylene oxide; sodium, potassium, lithium, magnesium, ammonium, and triethanolamine lauryl sulfate, coco sulfate, tridecyl sulfate, myrstyl sulfate, cetyl sulfate, cetearyl sulfate, stearyl sulfate, oleyl sulfate, and tallow sulfate, disodium lauryl sulfosuccinate, disodium laureth sulfosuccinate, sodium cocoyl isethionate, sodium $C_{12}$-$C_{14}$ olefin sulfonate, sodium laureth-6 carboxylate, sodium methyl cocoyl taurate, sodium cocoyl glycinate, sodium myristyl sarcocinate, sodium dodecylbenzene sulfonate, sodium cocoyl sarcosinate, sodium cocoyl glutamate, potassium myristoyl glutamate, triethanolamine monolauryl phosphate, and fatty acid soaps, including the sodium, potassium, ammonium, and triethanolamine salts of a saturated and unsaturated fatty acids containing from 6 to 30 or 8 to 24 carbon atoms.

The term "amphoteric surfactant" as used herein, is also intended to encompass zwitterionic surfactants, which are well known to formulators skilled in the art as a subset of amphoteric surfactants. Nonlimiting examples of amphoteric surfactants are disclosed McCutcheon's Detergents and Emulsifiers, North American Edition, supra, and McCutcheon's, Functional Materials, North American Edition, supra; both of which are incorporated by reference herein in their entirety. Suitable examples include but are not limited to amino acids (e.g., N-alkyl amino acids and N-acyl amino acids), betaines, sultaines, and alkyl amphocarboxylates.

Amino acid based surfactants suitable in the practice of the present invention include surfactants represented by the formula:

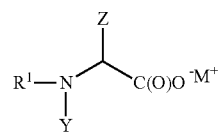

wherein $R^1$ represents a saturated or unsaturated hydrocarbon group having 10 to 22 carbon atoms or an acyl group containing a saturated or unsaturated hydrocarbon group having 9 to 30 carbon atoms, Y is hydrogen or methyl, Z is selected from hydrogen, —$CH_3$, —$CH(CH_3)_2$, —$CH_2CH(CH_3)_2$, —$CH(CH_3)CH_2CH_3$, —$CH_2C_6H_5$, —$CH_2C_6H_4OH$, —$CH_2OH$, —$CH(OH)CH_3$, —$(CH_2)_4NH_2$, —$(CH_2)_3NHC(NH)NH_2$, —$CH_2C(O)O^-M^+$, —$(CH_2)_2C(O)O^-M^+$. M is a salt forming cation, such as an amine, alkanol amine, or a mono- or poly-alkyleneamine. In one aspect, $R^1$ represents a radical selected from a linear or branched $C_{10}$ to $C_{22}$ alkyl group, a linear or branched $C_{10}$ to $C_{22}$ alkenyl group, an acyl group represented by $R^2C(O)$—, wherein $R^2$ is selected from a linear or branched $C_9$ to $C_{22}$ alkyl group, a linear or branched $C_9$ to $C_{22}$ alkenyl group. In one aspect, $M^+$ is a cation selected from sodium, potassium, ammonium, and triethanolamine (TEA).

The amino acid surfactants can be derived from the alkylation and acylation of α-amino acids such as, for example, alanine, arginine, aspartic acid, glutamic acid, glycine, isoleucine, leucine, lysine, phenylalanine, serine, tyrosine, and valine. Representative N-acyl amino acid surfactants are, but not limited to the mono- and di-carboxylate salts (e.g., sodium, potassium, ammonium and TEA) of N-acylated glutamic acid, for example, sodium cocoyl glutamate, sodium lauroyl glutamate, sodium myristoyl glutamate, sodium palmitoyl glutamate, sodium stearoyl glutamate, disodium cocoyl glutamate, disodium stearoyl glutamate, potassium cocoyl glutamate, potassium lauroyl glutamate, and potassium myristoyl glutamate; the carboxylate salts (e.g., sodium, potassium, ammonium and TEA) of N-acylated alanine, for example, sodium cocoyl alaninate, and TEA lauroyl alaninate; the carboxylate salts (e.g., sodium, potassium, ammonium and TEA) of N-acylated glycine, for example, sodium cocoyl glycinate, and potassium cocoyl glycinate; the carboxylate salts (e.g., sodium, potassium, ammonium and TEA) of N-acylated sarcosine, for example, sodium lauroyl sarcosinate, sodium cocoyl sarcosinate, sodium myristoyl sarcosinate, sodium oleoyl sarcosinate, and ammonium lauroyl sarcosinate; and mixtures of the foregoing surfactants.

The betaines and sultaines useful in the present invention are selected from alkyl betaines, alkylamino betaines, and alkylamido betaines, as well as the corresponding sulfobetaines (sultaines) represented by the formulas:

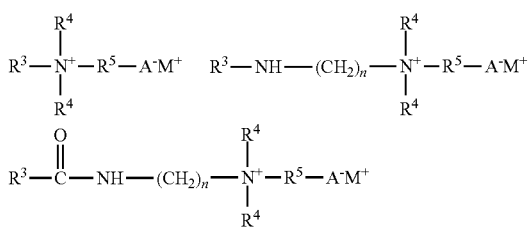

wherein $R^3$ is a $C_7$-$C_{22}$ alkyl or alkenyl group, each $R^4$ independently is a $C_1$-$C_4$ alkyl group, $R^5$ is a $C_1$-$C_5$ alkylene group or a hydroxy substituted $C_1$-$C_5$ alkylene group, n is an integer from 2 to 6, A is a carboxylate or sulfonate group, and M is a salt forming cation. In one aspect, $R^3$ is a $C_{11}$-$C_{18}$ alkyl group or a $C_{11}$-$C_{18}$ alkenyl group. In one aspect, $R^4$ is methyl. In one aspect, $R^5$ is methylene, ethylene or hydroxy propylene. In one aspect, n is 3. In a further aspect, M is selected from sodium, potassium, magnesium, ammonium, and mono-, di- and triethanolamine cations.

Examples of suitable betaines include, but are not limited to, lauryl betaine, coco betaine, oleyl betaine, cocohexadecyl dimethylbetaine, lauryl amidopropyl betaine, cocoamidopropyl betaine (CAPB), and cocamidopropyl hydroxysultaine.

The alkylamphocarboxylates such as the alkylamphoacetates and alkylamphopropionates (mono- and disubstituted carboxylates) can be represented by the formula:

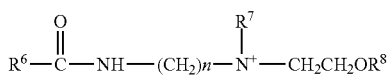

wherein $R^6$ is a $C_7$-$C_{22}$ alkyl or alkenyl group, $R^7$ is —$CH_2C(O)O^-M^+$, —$CH_2CH_2C(O)O^-M^+$, or —$CH_2CH(OH)CH_2SO_3^-M^+$, $R^8$ is hydrogen or —$CH_2C(O)O^-M^+$, and M is a cation selected from sodium, potassium, magnesium, ammonium, and mono-, di- and triethanolamine.

Exemplary alkylamphocarboxylates include, but are not limited to, sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

Non-limiting examples of nonionic surfactants are disclosed in McCutcheon's Detergents and Emulsifiers, North American Edition, 1998, supra; and McCutcheon's, Functional Materials, North American, supra; both of which are incorporated by reference herein in their entirety. Additional Examples of nonionic surfactants are described in U.S. Pat. No. 4,285,841, to Barrat et al., and U.S. Pat. No. 4,284,532, to Leikhim et al., both of which are incorporated by reference herein in their entirety. Nonionic surfactants typically have a hydrophobic portion, such as a long chain alkyl group or an alkylated aryl group, and a hydrophilic portion containing various degrees of ethoxylation and/or propoxylation (e.g., 1 to about 50) ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty acids, condensation products of ethylene oxide with long chain amines or amides, condensation products of ethylene oxide with alcohols, and mixtures thereof.

Suitable nonionic surfactants include, for example, alkyl polysaccharides, alcohol ethoxylates, block copolymers, castor oil ethoxylates, ceto/oleyl alcohol ethoxylates, cetearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, monobranched alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, tallow oil fatty acid ethoxylates, tallow amine ethoxylates, tridecanol ethoxylates, acetylenic diols, polyoxyethylene sorbitols, and mixtures thereof. Various specific examples of suitable nonionic surfactants include, but are not limited to, methyl gluceth-10, PEG-20 methyl glucose distearate, PEG-20 methyl glucose sesquistearate, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, poloxamers such as poloxamer 188, polysorbate 21, polysorbate 40, polysorbate 60, polysorbate 61, polysorbate 65, polysorbate 80, polysorbate 81, polysorbate 85, sorbitan caprylate, sorbitan cocoate, sorbitan diisostearate, sorbitan dioleate, sorbitan distearate, sorbitan fatty acid ester, sorbitan isostearate, sorbitan laurate, sorbitan oleate, sorbitan palmitate, sorbitan sesquiisostearate, sorbitan sesquioleate, sorbitan sesquistearate, sorbitan stearate, sorbitan triisostearate, sorbitan trioleate, sorbitan tristearate, sorbitan undecylenate, or mixtures thereof.

Alkyl glycoside nonionic surfactants can also be employed and are generally prepared by reacting a monosaccharide, or a compound hydrolyzable to a monosaccharide, with an alcohol such as a fatty alcohol in an acid medium. For example, U.S. Pat. Nos. 5,527,892 and 5,770,543 describe alkyl glycosides and/or methods for their preparation. Suitable examples are commercially available under the names of Glucopon™ 220, 225, 425, 600 and 625, PLANTACARE®, and PLANTAPON®, all of which are available from Cognis Corporation of Ambler, Pa.

In another aspect, nonionic surfactants include, but are not limited to, alkoxylated methyl glucosides such as, for example, methyl gluceth-10, methyl gluceth-20, PPG-10 methyl glucose ether, and PPG-20 methyl glucose ether, available from Lubrizol Advanced Materials, Inc., under the trade names, Glucam® E10, Glucam® E20, Glucam® P10, and Glucam® P20, respectively; and hydrophobically modified alkoxylated methyl glucosides, such as PEG 120 methyl glucose dioleate, PEG-120 methyl glucose trioleate, and PEG-20 methyl glucose sesquistearate, available from Lubrizol Advanced Materials, Inc., under the trade names, Glucamate® DOE-120, Glucamate™ LT, and Glucamate™

SSE-20, respectively, are also suitable. Other exemplary hydrophobically modified alkoxylated methyl glucosides are disclosed in U.S. Pat. Nos. 6,573,375 and 6,727,357, the disclosures of which are hereby incorporated by reference in their entirety.

Other useful nonionic surfactants include water soluble silicones such as PEG-10 Dimethicone, PEG-12 Dimethicone, PEG-14 Dimethicone, PEG-17 Dimethicone, PPG-12 Dimethicone, PPG-17 Dimethicone and derivatized/functionalized forms thereof such as Bis-PEG/PPG-20/20 Dimethicone Bis-PEG/PPG-16/16 PEG/PPG-16/16 Dimethicone, PEG/PPG-14/4 Dimethicone, PEG/PPG-20/20 Dimethicone, PEG/PPG-20/23 Dimethicone, and Perfluorononylethyl Carboxydecyl PEG10 Dimethicone.

The amount of the total surfactant (active weight basis) utilized in formulating the structured unit dose dissolvable article depends on the final purpose for the formulation.

In an embodiment, the structured unit dose dissolvable article can be used as a concentrate in preparing a household or hard surface cleaner by, for example, dissolving the unit dose in a volume of a solvent, such as water. For a household or hard surface cleaner, the structured unit dose dissolvable article should contain sufficient surfactant to provide the household or hard surface cleaner with from about 0.25 wt % to about 10 wt % of total surfactant, based on the weight of the total home or hard surface cleaner formulation, or from about 0.5wt % to about 9wt %, or 1 or 2wt % to about 8wt %.

In another embodiment, the structured unit dose dissolvable article can be used as tablets or pods in a laundry or dish cleansing application. The dish cleansing application can include both manual dish formulations as well as automatic dish formulations. In such laundry and dish applications, the total surfactant can range from about 1 to about 75 wt % based on the weight of the total composition of the structured unit dose dissolvable article, or from about 5 to about 70wt %, or even 10 to 65wt % or about 20 to about 60 wt %.

The structured unit dose dissolvable article also includes a structurant composition. The structurant composition provides structure to the structured unit dose dissolvable article and includes a fatty acid or mixtures thereof, and at least one water soluble or water dispersible polymer or mixtures thereof.

The fatty acids can include, for example, $C_6$ to $C_{30}$ fatty acids, such as, for example, oleic acid, decanoic acid, caprylic acid, lauric acid, myristic acid, palmitic acid, stearic acid, or combinations thereof.

The amount of the $C_6$ to $C_{30}$ fatty acid (active weight basis) utilized in formulating the structured unit dose dissolvable article can range from about 3 to about 40 wt %, or even from about 5 to about 30 wt %, and in some embodiments from about 6 to about 25 wt %, or even about 8 to about 20 wt % or about 10 to about 15 wt %.

The water soluble or water dispersible polymer can be, for example, a hydrocolloid polymer, a poly(alkylene) glycol containing polymer, a poly(vinyl) alcohol containing polymer, a poly(vinyl)pyrolidone containing polymer, a poly(acrylamide) containing polymer, a poly(urethane) containing polymer, and derivatives and combinations thereof.

The water soluble or water dispersible polymer can be, for example, a hydrocolloid polymer. Hydrocolloid polymer are hydrophilic polymers that generally contain numerous hydroxyl groups that help to thicken or gel an aqueous formulation. Hydrocolloid polymers can be of vegetable, animal, microbial or synthetic origin, and can include natural water soluble and water swellable polymers, such as mono- or oligo- polysaccharides, including, for example, starch, cellulose, gelatin, alginate, xanthan, cassia gum, and the like, and including their derivatives.

Polymers containing units derived from poly(alkylene) glycol may be employed as the water soluble or water dispersible polymer. The poly(alkylene) glycol units may be, for example, polyethylene glycol, polypropylene glycol, polybutylene glycol, or mixtures thereof, but particularly preferred are polymers containing polyethylene glycol derived units.

In an embodiment, the water soluble or water dispersible polymer can be a polyethylene glycol polymer having a number average molecular weight ("Mn") of from about 200 to about 1,000,000, as measured by GPC with a polyethyelen glycol standard, although polyethylene glycol polymer of from about 500 to about 750,000, or from about 1000 to about 500,000, or even from about 1750 to about 125,000, or from about 2000 to about 50,000, or even 2500 to about 25,000 or about 3000 to about 10,0000 may also be employed.

The water soluble or water dispersible polymer can also be a block copolymer containing poly(alkylene) glycol units. For example, a polymer containing from about 2 to about 2000 in one aspect, from about 5 to about 1000 in another aspect, and from about 10 to about 500 in a further aspect of ethylene, propylene and/or butylene oxide units, arranged in block or random sequences of ethylene oxide, propylene oxide and/or butylene oxide units.

The water soluble or water dispersible polymer can also be a substituted polyol.

Polyols suitable for use in the substituted polyol include any compounds having three or more hydroxyl groups per molecule and that are reactive with the substituent reagents described below. General examples include glycerols, polyglycerols, sugar alcohols (e.g., sorbitol or sorbitan), and oligosaccharide (saccharide polymers having 2 to 10 monosaccharide units) or polysaccharides (saccharide polymers having more than 10 monosaccharide units, such as 11 to 250 units, or 11 to 200, or 11 to 150 units). Monosaccharides from which the oligosaccharides and polysaccharides may be derived include, for example, glucose, fructose, mannose and galactose. Examples of particular oligosaccharides include, sucrose, maltose, and lactose. Polysaccharides include starch and cellulose, for example. The most used of the saccharide group is often glucose or galactose. In an embodiment, the polysaccharide includes a polyglucose polymer.

Additional examples of the polyols include, but are not limited to, trimethylolethane [2-methyl-2-(hydroxymethyl)-1,3-propanediol], trimethylolpropane[2ethyl-2-(hydroxymethyl)-1,3-propanediol], pentaerythritol (2,2-dimethylol -1,3-propanediol), diglycerol (glycerol dimer), dipentaerythritol, glycerol, and the like. The polyol can also be, for example, glucose derivatives (e.g., glycosides including, but not limited to, glucosides, galactosides, monosaccharides, oligosaccharides having up to about 10-99 saccharide repeating units per molecule and sucrose). Further polyol materials include, but are not limited to, glucosides (e.g., alkyl glucosides including, but not limited to, methyl glucoside, ethyl glucoside, propyl glucoside, butyl glucoside and amyl glucoside). Such polyols are commercially available.

Substituents for the substituted polyols can be derived, for example, from poly(alkylene) glycol (such as polyethylene glycol), and polymers such as poly(vinyl) alcohol, poly(vinyl)pyrolidones, poly(acrylamide) or combinations thereof.

In an embodiment, the substituent is derived from a poly(alkylene) glycol. Suitable reagents for alkoxylating the foregoing polyols include, but are not limited to, alkylene oxides (e.g., ethylene oxide, propylene oxide, butylene oxide and mixtures thereof). Other alkoxylating reagents including, but not limited to, higher alkylene oxides can also be used. Numerous alkylene oxides are commercially available and would be suitable for use in alkoxylating the polyols. The amount of alkoxylation is typically from about 10 to about 1000, or from about 20 to about 500, or even from about 30 to about 300 moles of alkylene oxide per mole of polyol. Here, as well as elsewhere in the specification and claims, individual numerical values, or limits, can be combined to form additional non-disclosed and/or non-stated ranges. Methods for alkoxylating polyols, for example, by direct alkoxylation, are known to those skilled in the art and as such a detailed discussion herein is omitted for the sake of brevity. In an embodiment, the substituent can be derived from ethylene oxide.

In one embodiment, the substituted polyol can be an alkoxylated saccharide, such as, for example, a polyethylene glycol methyl glucose polymer having from about 2 to about 1000 moles of polyethylene glycol per mole of methyl glucose.

The substituted polyol can further be derivatized with a lipophilic reagent, and/or crosslinked with a crosslinking agent. The lipophilic reagents suitable to derivatize the polyols can include hydrocarbon or substituted hydrocarbon moieties with from about 6 to about 30, or from about 12 to about 26, or even from about 16 to about 22 carbon atoms per molecule. The particular structure of the lipophilic reagents is not critical and may, for example, be alkyl, aryl, alkylaryl, alkenyl and may be cyclic, branched or straight. Typically, the lipophilic reagents are fatty acids, fatty esters, epoxides, halides glycidyl ethers, or vegetable or animal oils. The reagents typically provide either an ester or ether linkage to the polyol. Stated another way, in the case of a glucose derivative, for example, the ether or ester is typically attached to the glucose derivative indirectly through a polyoxyalkylene chain. Examples of suitable fatty acid lipophilic reagents can include natural or synthetic saturated or unsaturated acids which are linear or branched. The fatty acids can be used alone or as a mixture. Natural fatty acids include, for example, saturated or unsaturated linear fatty acids such as caproic acid, enanthic acid, caprylic acid, pelargonic acid, decanoic acid, lauric acid, myristic acid, palmitic acid, stearic acid, linolic acid, oleic acid, capric acid and undecanoic acid which are typically obtained by hydrolyzing vegetable oils and animal oils such as coconuts oils, palm oil, tallow, linseed oil, castor, tall-oil and soybean oil. Examples of synthetic fatty acids, include linear or branched fatty acids prepared by oxidizing olefin polymers. It is also possible to use fatty acids derived from microorganisms such as, for example, γ-linolenic acid. Further, as the lower alkyl ester of the fatty acid, alkyl esters having 1 to 8 carbon atoms such as methyl, ethyl or propyl ester of the fatty acid described above can be used. Examples of other suitable lipophilic reagents include glycidyl ethers, for example, nonylphenylglycidyl ether or dodecylphenyl glycidyl ether, α-olefin epoxides, for examples, 1,2-epoxyhexadecane and their respective chlorohydrins, or alkyl halides, for examples, dodecylbromide, and the above-mentioned vegetable and animal oils. Halogenated products of fatty acids can also be used as the lipophilic reagent. In an embodiment, the alkoxylated polymer can be derivatized with a lipophilic reagent, such as a mono- or di-alkyl $C_3$ to $C_{60}$ fatty acid Typically, the average substitution level of the lipophilic substituent is about 3, for example, from about 2.5 to about 4, or from about 2.5 to about 3.9 and more preferably from about 2.8 to 3.6, moles per mole of polyol.

Crosslinking agents for the substituted polyols include dibasic fatty acid. The dibasic fatty acid itself is not particularly limited as long as it produces 2 hydrogen ions from one molecule upon ionization. In other words, any hydrocarbon compound having 2 carboxyl groups in one molecule (dibasic fatty acid) may be employed, such as saturated aliphatic dibasic fatty acids including, for example, adipic acid, sebacic acid, azelaic acid, succinic acid and the like, or unsaturated aliphatic dibasic acid, such as, for example, (e.g., phthalic acid, maleic acid and the like), and the like. The dibasic fatty acid can be derived from a natural source, or be synthetically prepared. Natural dibasic fatty acids generally contain, for example, from about 8 to 30, or from about 12 to 26, or even from about 16 to 22 carbon atoms per molecule. Synthetic dibasic fatty acids would likely be those having more than 30 carbon atoms, such as, for example, 32 to 60, or 34 to 55 carbon atoms.

The at least one water soluble or water dispersible polymer can also include a thermoplastic polyurethane ("TPU") including units derived from polyester polyol, polyether polyol, polycaprolactone diol, polybutadiene polyol and their mixtures, as well as end-capped polyurethanes.

The TPU can be the reaction product of (i) a polyisocyanate component, (ii) a polyol component, and optionally (iii) a chain extender component and/or a chain terminator component.

The polyisocyanate component can include one or more polyisocyanates. In some embodiments, the polyisocyanate component includes one or more diisocyanates. Suitable polyisocyanates include aromatic diisocyanates, aliphatic diisocyanates, or combinations thereof. Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), xylene diisocyanate (XDI), hydrogenated XDI (H6XDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate may include H12MDI.

The polyisocyanate can be included in the TPU generally in an amount of about 0.5 to about 30wt % of the TPU, or even from about 1 to about 20 wt %, or from about 1.5 to about 15 wt %, or about 2.0 to about 10 wt %.

The polyol component in the TPU compositions can include polyether polyols, polyester polyols, polycaprolactone diol, polybutadiene polyol and their mixtures.

Suitable polyester polyols can include linear polyesters having a number average molecular weight (Mn) of from about 500 to about 10,000, from about 700 to about 5,000, or from about 700 to about 4,000, and generally have an acid number generally less than 1.3 or less than 0.5. The molecular weight is determined by assay of the terminal functional groups and is related to the number average molecular weight. Suitable polyester polyols can include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester polyol can be aliphatic, aromatic, or combinations thereof, including any of the glycol described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable polyether polyols include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethylene glycol) comprising water reacted with tetrahydrofuran (PTMEG). In some embodiments, the polyether polyol includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether polyols generally have a number average molecular weight (Mn) as determined by assay of the terminal functional groups which is an average molecular weight greater than about 700, such as from about 700 to about 10,000, from about 1000 to about 5000, or from about 1000 to about 2500. In some embodiments, the polyether polyol includes a blend of two or more different molecular weight polyethers, such as a blend of 2000 Mn and 1000 Mn PTMEG.

The polyol component, when present, may include poly(ethylene glycol), poly(tetramethylene glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethylene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

In some embodiments, the polyol component includes a polyether polyol, such as polyethylene glycol.

The TPU composition can also optionally include a chain extender component. Chain extenders include diols, diamines, and combination thereof. Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2bis[4-(2-hydroxyethoxyl)phenyl]propane (HEPP), hexamethylenediol, heptanediol, nonanediol, dodecanediol, ethylenediamine, butanediamine, hexamethylenediamine, and hydroxyethyl resorcinol (HER), and the like, as well as mixtures thereof. In some embodiments, the chain extender includes BDO, HDO, or a combination thereof. In some embodiments, the chain extender includes BDO. Other glycols, such as aromatic glycols could be used, but in some embodiments the TPUs are essentially free of or even completely free of such materials. In some embodiments, the chain extender component, when present, includes ethylene glycol, butanediol, hexamethylenediol, pentanediol, heptanediol, nonanediol, dodecanediol, ethylenediamine, butanediamine, hexamethylenediamine, or a combination thereof.

The TPU can also optionally include a chain terminator component. The chain terminator component can include compounds having a single NCO-reactive functional group capable of terminating the chain of the TPU. Suitable functional groups include a hydroxyl (alcohol) functional group, a primary amine functional group, a secondary amine functional group, an anhydride functional group, an epoxy functional group, a thiol functional group, a carboxy (carboxylic acid) functional group, a isocyanate functional group, or a combination thereof. In some embodiments, the chain terminator component includes polyethylene mono alcohols, ethoxylated polyethylene mono alcohols, carboxylic acid terminated polyethylene, or any combination thereof.

In some embodiments, the TPU can include a polyisocyanate component, such as a diisocyanate, including MDI, H12MDI, HDI, TDI, IPDI, LDI, BDI, PDI, TODI, NDI or a combination thereof, generally in an amount of about 0.5 to about 30wt % of the TPU, or even from about 1 to about 20 wt %, or from about 1.5 to about 15 wt %, or about 2.0 to about 10 wt %; a polyol component, such as a polyether polyol, including polyethylene glycol, generally in an amount of about 40 to about 99 wt % of the TPU, or even from about 60 to about 98 wt %, or from about 70 to about 97 wt %, or about 80 to about 96 wt %; and, if present, a chain extender component, such as a diol, a diamine, or a combination thereof, including ethylene glycol, butanediol, hexamethylenediol, pentanediol, heptanediol, nonanediol, dodecanediol, ethylenediamine, butanediamine, hexamethylenediamine, or a combination thereof, generally in an amount of about 0.5 to about 30wt % of the TPU, or even from about 1 to about 20 wt %, or from about 1.5 to about 15 wt %, or about 2.0 to about 10 wt %.

The structured unit dose dissolvable article can also include other additives, such as, for example, hydrotropes, fragrances, botanicals, pigments, insoluble materials, chelating agent, natural polysaccharides, builders, biocidal agents, enzymes, foam stabilizing agents, fluorescent whitening agent, dispersants, soil release polymers, and the like.

To prevent phase separation, a hydrotrope (a compound that is soluble in aqueous solutions and that increases the aqueous solubility of organic compounds) is often added. Common hydrotropes include urea, lower molecular weight alkanols, glycols, and ammonium, potassium or sodium salts of toluene, xylene or cumene or ethyl benzene sulfonates such as sodium xylene sulfonate. The latter hydrotropes tend to be more expensive, so less expensive hydrotropes, such as urea (($NH_2$)$_2$CO) or urea-alkanol mixtures, are frequently used as cost-effective substitutes. Greater quantities of these hydrotropes are required, however, to achieve the stabilizing effects of the more expensive hydrotropes. Other hydrotropes include compounds such as triethanolamine, betaines, alkylglucosides, polyalkylglucosides, glycerine, certain short-chain organic alcohols (e.g., ethanol), propylene glycol and even longer-alkyl chain (e.g., $C_{10}$-$C_{14}$) amine oxides.

The structured unit dose dissolvable article can also include fragrances. Suitable fragrance oils include extracts from natural raw materials, such as, essential oils, concretes, absolutes, resins, resinoids, balsams, and tinctures; hydrocarbons, such as, for example, 3-carene; .alpha.-pinene; .beta.-pinene; .alpha.-terpinene; .gamma.-terpinene; p-cymene; bisabolene; camphene; caryophyllene; cedrene; farnesene; limonene; longifolene; myrcene; ocimene; valencene; (E,Z)-1,3,5-undecatriene; styrene; diphenylmethane; aliphatic alcohols; cyclic alcohols; cycloaliphatic alcohols; aliphatic ketones; acyclic terpene alcohols; cyclic terpene alcohols; cyclic terpene aldehydes and ketones; and mixtures thereof. Other fragrance and perfume components that may be used include natural and synthetic fragrances, perfumes, scents, and essences and any other substances which emit a fragrance. As the natural fragrances, there are those of vegetable origin, such as oil extracts from flowers (e.g., lily, lavender, rose, jasmine, neroli, ylang-ylang), stems and leaves (geranium, patchouli, petitgrain, peppermint), fruits (aniseed, coriander, fennel, needle juniper), fruit skin (bergamot, lemon, orange), roots (mace, angelica, celery, cardamom, costus, iris, sweet flag), woods (pine tree, sandalwood, guaiacum wood, cedar, rosewood, cinnamon), herbs and grasses (tarragon, lemongrass, sage, thyme), needles and twigs (spruce, pine, European red pine, stone pine), and resins and balsam (galbanum, elemi, benzoin, myrrh, frankincense, opopanax), and those of animal origin, such as musk, civet, castoreum, ambergris, or the like, and mixtures thereof. Examples of synthetic fragrances and perfumes are the aromatic esters, ethers, aldehydes, ketones, alcohols, and hydrocarbons including, but are not limited to, benzyl acetate, phenoxyethyl isobutylate, p-tert-butylcyclohexyl acetate, linalyl acetate, dimethylbenzylcarbinyl acetate, phenylethyl acetate, linalyl benzoate, benzyl formate, ethylmethylphenyl glycinate, allylcyclohexyl propionate, styralyl propionate, and benzyl salicylate; benzylethyl ether; straight chain alkanals having 8 to 18 carbon atoms, citral, citronellal, citronellyloxyaldehyde, cyclamen aldehyde, hydroxycitronellal, lilial, and bougeonal; ionone compounds, .alpha.-isomethyl ionone, and methyl cedryl ketone; anethole, citronellol, eugenol, isoeugenol, geraniol, lavandulol, nerolidol, linalool, phenylethyl alcohol, and terpineol, alpha-pinene, terpenes (e.g., limonene), and balsams, and mixtures thereof.

The structured unit dose dissolvable article can also include botanicals. Suitable botanical agents may include, for example, extracts from Echinacea (e.g., sp. angustifolia, purpurea, pallida), yucca glauca, willow herb, basil leaves, Turkish oregano, carrot root, grapefruit, fennel seed, rosemary, tumeric, thyme, blueberry, bell pepper, blackberry, spirulina, black currant fruit, tea leaves, such as for, example, Chinese tea, black tea (e.g., var. Flowery Orange Pekoe, Golden Flowery Orange Pekoe, Fine Tippy Golden Flowery Orange Pekoe), green tea (e.g., var. Japanese, Green Darjeeling), oolong tea, coffee seed, dandelion root, date palm fruit, gingko leaf, green tea, hawthorn berry, licorice, sage, strawberry, sweet pea, tomato, vanilla fruit, comfrey, arnica, centella asiatica, cornflower, horse chestnut, ivy, magnolia, oat, pansy, skullcap, seabuckthorn, white nettle, and witch hazel. Botanical extracts may also include, for example, chlorogenic acid, glutathione, glycrrhizin, neohesperidin, quercetin, rutin, morin, myricetin, absinthe, and chamomile.

Suitable particulate materials include pigments. Exemplary pigments are metal compounds or semi metallic compounds and may be used in ionic, nonionic or oxidized form. The pigments can be in this form either individually or in admixture or as individual mixed oxides or mixtures thereof, including mixtures of mixed oxides and pure oxides. Examples are the titanium oxides (e.g., $TiO_2$), zinc oxides (e.g., ZnO), aluminum oxides (for example, $Al_2O_3$), iron oxides (for example, $Fe_2O_3$), manganese oxides (e.g., MnO), silicon oxides (e.g., $SiO_2$), silicates, cerium oxides, zirconium oxides (e.g., $ZrO_2$), barium sulfate ($BaSO_4$), nylon-12, and mixtures thereof. Other examples of pigments include thermochromic dyes that change color with temperature, calcium carbonate, aluminum hydroxide, calcium sulfate, kaolin, ferric ammonium ferrocyanide, magnesium carbonate, carmine, barium sulfate, mica, bismuth oxychloride, zinc stearate, manganese violet, chromium oxide, titanium dioxide nanoparticles, barium oxide, ultramarine blue, bismuth citrate, hydroxyapatite, zirconium silicate, carbon black particles, and the like.

Insoluble materials suitable for use in the structured unit dose dissolvable article include, but are not limited to, clay, swellable clay, laponite, gas bubbles, liposomes, microsponges, beads and flakes. Beads, flakes and capsules can be included in a composition for aesthetic appearance or can function as microencapsulants for the delivery of benefit agents. Exemplary bead components include, but are not limited to, agar beads, alginate beads, jojoba beads, gelatin beads, Styrofoam™ beads, polyacrylate, polymethylmethacrylate (PMMA), polyethylene beads.

Chelating agents can be employed to stabilize the structured unit dose dissolvable article against the deleterious effects of metal ions. When utilized, suitable chelating agents include EDTA (ethylene diamine tetraacetic acid) and salts thereof such as disodium EDTA, citric acid and salts thereof, cyclodextrins, and the like, and mixtures thereof. Such suitable chelators typically comprise 0.001 wt. % to 3 wt. %, e.g., 0.01 wt. % to 2 wt. %, or 0.01 wt. % to 1 wt. % of the composition.

The structured unit dose dissolvable article can include natural polysaccharides obtained from tree and shrub exudates, such as gum arabic, gum gahatti, and gum tragacanth, as well as pectin; seaweed extracts, such as alginates and carrageenans (e.g., lambda, kappa, iota, and salts thereof); algae extracts, such as agar; microbial polysaccharides, such as xanthan, gellan, and wellan; cellulose ethers, such as ethylhexylethylcellulose, hydroxybutylmethylcellulose, hydroxyethylmethylcellulose, hydroxypropyl-methylcellulose, methylcellulose, carboxymethylcellulose, hydroxyethylcellulose, and hydroxypropylcellulose; polygalactomannans, such as fenugreek gum, cassia gum, locust bean gum, tara gum, and guar gum.

Other suitable components include organic or inorganic detergency builders. Examples of water-soluble inorganic builders that can be used, either alone or in combination with themselves or with organic alkaline sequestrant builder salts, are glycine, alkyl and alkenyl succinates, alkali metal carbonates, alkali metal bicarbonates, phosphates, polyphosphates and silicates. Specific examples of such salts are sodium tripolyphosphate, sodium carbonate, potassium carbonate, sodium bicarbonate, potassium bicarbonate, sodium pyrophosphate and potassium pyrophosphate. Examples of organic builder salts that can be used alone, or in combination with each other include alkali metal polycarboxylates, such as Noverite™ AD810 or LD920, water-soluble citrates such as sodium and potassium citrate, sodium and potassium tartrate, sodium and potassium ethylenediaminetetraacetate, sodium and potassium N-(2-hydroxyethyl)-nitrilo tri acetates, sodium and potassium N-(2-hydroxyethyl)-nitrilo diacetates, sodium and potassium oxydisuccinates, and sodium and potassium tartrate mono- and di-succinates.

Suitable biocidal agents include triclosan (5-chloro-2 (2,4-dichloro-phenoxy)phenol)), and the like. Suitable optical brighteners include stilbenes, distyrylbiphenyl derivatives, stilbene/naphthotriazole blends, oxazole derivatives, and coumarin brighteners.

Suitable enzymes include those known in the art, such as amylolytic, proteolytic, cellulolytic or lipolytic type, for example. Other suitable enzymes include proteases, amylases, lipases and cellulases, bacterial protease, fungal lipase, bacterial amylase, fungal enzyme, and monocomponent cellulase. Additional enzymes of these classes suitable for use in accordance with the present invention will be well-known to those of ordinary skill in the art, and are available from a variety of commercial suppliers.

Suitable foam stabilizing agents include a polyalkoxylated alkanolamide, amide, amine oxide, betaine, sultaine, $C_8$-$C_{18}$ fatty alcohols. Foam stabilizing agents are used, for example, in amounts of about 1 to about 20, typically about 3 to about 5 percent by weight. The composition can further include an auxiliary foam stabilizing surfactant, such as a fatty acid amide surfactant. Suitable fatty acid amides are $C_8$-$C_{20}$ alkanol amides, monoethanolamides, diethanolamides, and isopropanolamides.

The structured unit dose dissolvable article may contain still further ingredients useful in home care compositions, such as, polymer dispersants, oxidizing agents, activators, catalysts, thickeners, bittering agents such as Bitrex, other stabilizers, soil suspending agents, brighteners, UV protectors, salts, water, inert ingredients, and the like.

The structured unit dose dissolvable article can be prepared by mixing the cleansing composition with the structurant composition, both compositions as described above. The structured unit dose dissolvable article can then be formed from the mixture of the cleansing composition and structurant composition.

The structured unit dose dissolvable article can be used to form a cleansing composition, such as a dishwashing cleansing composition, a laundry cleansing composition, a hard surface cleansing composition, and the like. In an embodiment, the structured unit dose dissolvable article may be used as is, for example, to rub on a tough stain, for example, as a pre-treatment, or as a concentrate that is dissolved into a solution and then used, for example, in a dishwasher, laundry machine, spray bottle, etc.

In one embodiment, the structured unit dose dissolvable article can be formed by molding the mixture, for example, by vacuum forming, injection molding, or even compression molding. In an embodiment, the structured unit dose dissolvable article can be formed by preparing the mixture of the cleansing composition and structurant composition and keeping the mixture at an elevated temperature to maintain the mixture in liquid form. The liquid mixture can then be filled into a mold, such as a tray, or a vacuum tray, and then allowed to form by either reducing temperature and/or removing solvents as casting the molding. The liquid mixture can also be injection molded into any of various shapes and configurations.

The structured unit dose dissolvable article may also be prepared by compression molding. The compression molding can be carried out on a solid slug of the mixture of the cleansing composition and structurant composition, prepared for example, by preparing the mixture of the cleansing composition and structurant composition and allowing the composition to solidify, followed with compression of the solid composition into the desired form.

In one embodiment, the structured unit dose dissolvable article composition can be cast or molded using the existing unit-dose manufacturing equipment. The existing unit-dose equipment would require minimal engineering modifications to facilitate formation of this new format. The structured unit dose dissolvable article can be formed by preparing the mixture of the cleansing composition and structurant composition and keeping the mixture at an elevated temperature to maintain the mixture in liquid form. The liquid mixture can then be filled into the mold of the existing equipment by injection pump.

In some embodiments, the structured unit dose dissolvable article may be provided in the form of a high surface area shape by perforating the form with holes or creating a non-smooth surface. A doughnut shape is an example shape having a portion of its center removed to allow a larger surface area for a solute to engulf the structured unit dose dissolvable article and cause it to dissolve.

In embodiments, the structured unit dose dissolvable article can be prepared from different formulations molded together into the same unit. For example, the structured unit can contain a formulation for cleansing and a separate formulation for fabric softening.

The dissolvable article can be made into any shape and incorporate any color. Examples of molded structured unit dose dissolvable articles can be seen in FIG. 1.

Figure 2:
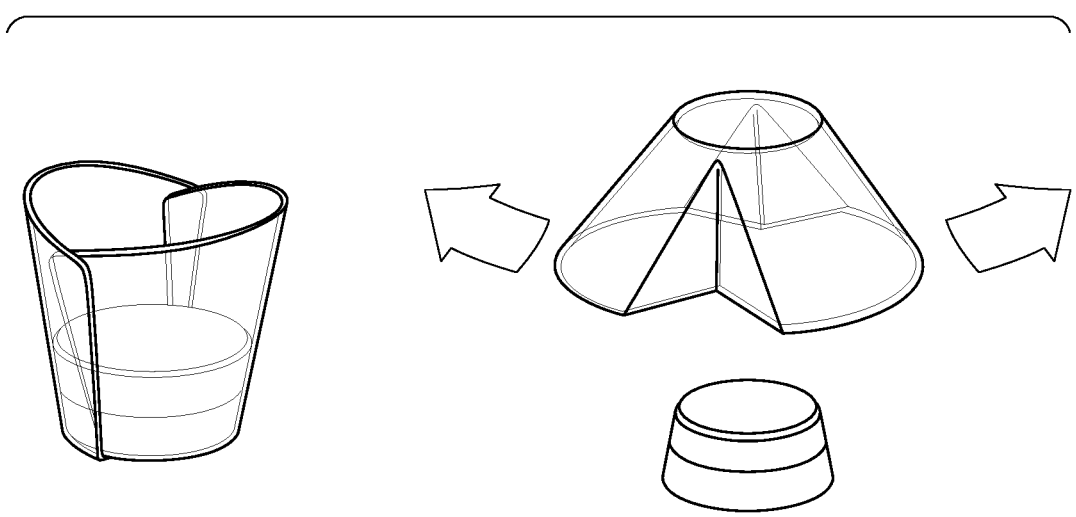
FIG. 2 provides examples of a structured unit dose dissolvable article in a dispensing cup.

In one embodiment, the liquid mixture can be filled into a dispensing cup and allowed to cool and solidify therein. In another aspect the structured unit dose dissolvable article can be molded and then fit into a dispensing cup. In an embodiment, the dispensing cup can be a dryer sheet. An example of a structured unit dose dissolvable article in a dispensing cup can be seen in FIG. 2.

Figure 3:
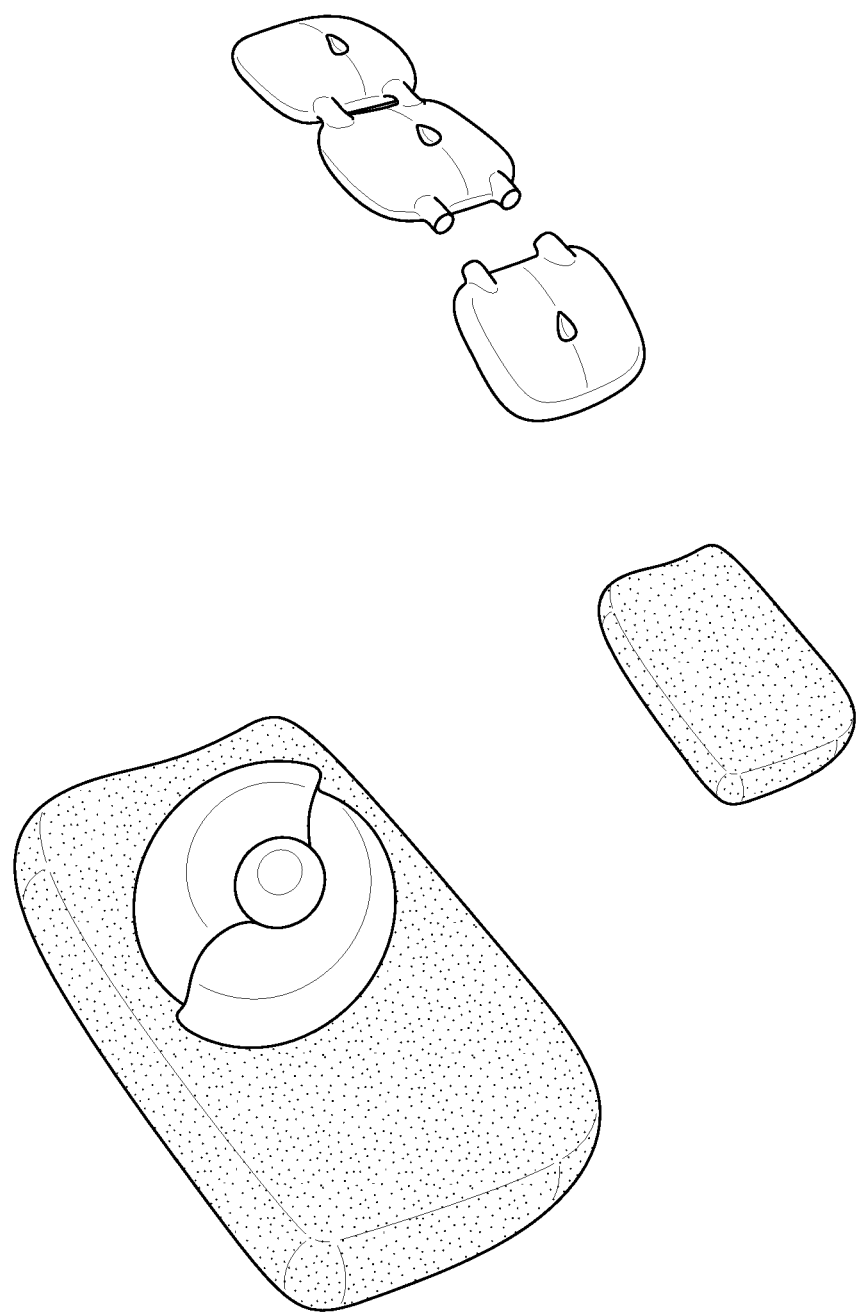
FIG. 3 provides examples of a continuous strip that is perforated or in some manner weakened at given lengths.

The structured unit dose dissolvable article may be compression molded into the form of a tape or a stick that allows discreet portion to be broken away in desired lengths. For example, the article may be formed into a continuous strip and then perforated or in some manner weakened at given lengths along the strip to allow discreet structured unit dose dissolvable article to break from the strip, as shown, for example, in FIG. 3.

The structured unit dose dissolvable article can also be formed by allowing the mixture to harden and then sculpting the hardened mixture, for example, through a 3D printing process or by a more traditional process of setting discreet amounts of the mixture on a surface, allowing the mixture to dry and harden, and sculpting the hardened mixture into the desired shape.

In other embodiments, the structured unit dose dissolvable article can be formed by extruding the mixture, or by putting the mixture through a die cutting process. It is also possible to extrude the mixture directly into the end consumer packaging.

In other embodiments, a solid composition of the mixture of the cleansing composition and structurant composition can be casted or molded or compressed into a form of an empty container, which is capable of holding a liquid cleansing composition inside.

In an embodiment, the structured unit dose dissolvable article may be a coating on a preformed form, for example, in a dipping or coating process.

After formation, the structured unit dose dissolvable article can also be coated with a coating. For example, the structured unit dose dissolvable article may be coated to help delay dissolution, or for aesthetic or tactile purposes.

In an embodiment, the structured unit dose dissolvable article may be coated, or packaged in or with a dissolvable tab to avoid handling of the bare structured unit dose dissolvable article.

Figure 4:
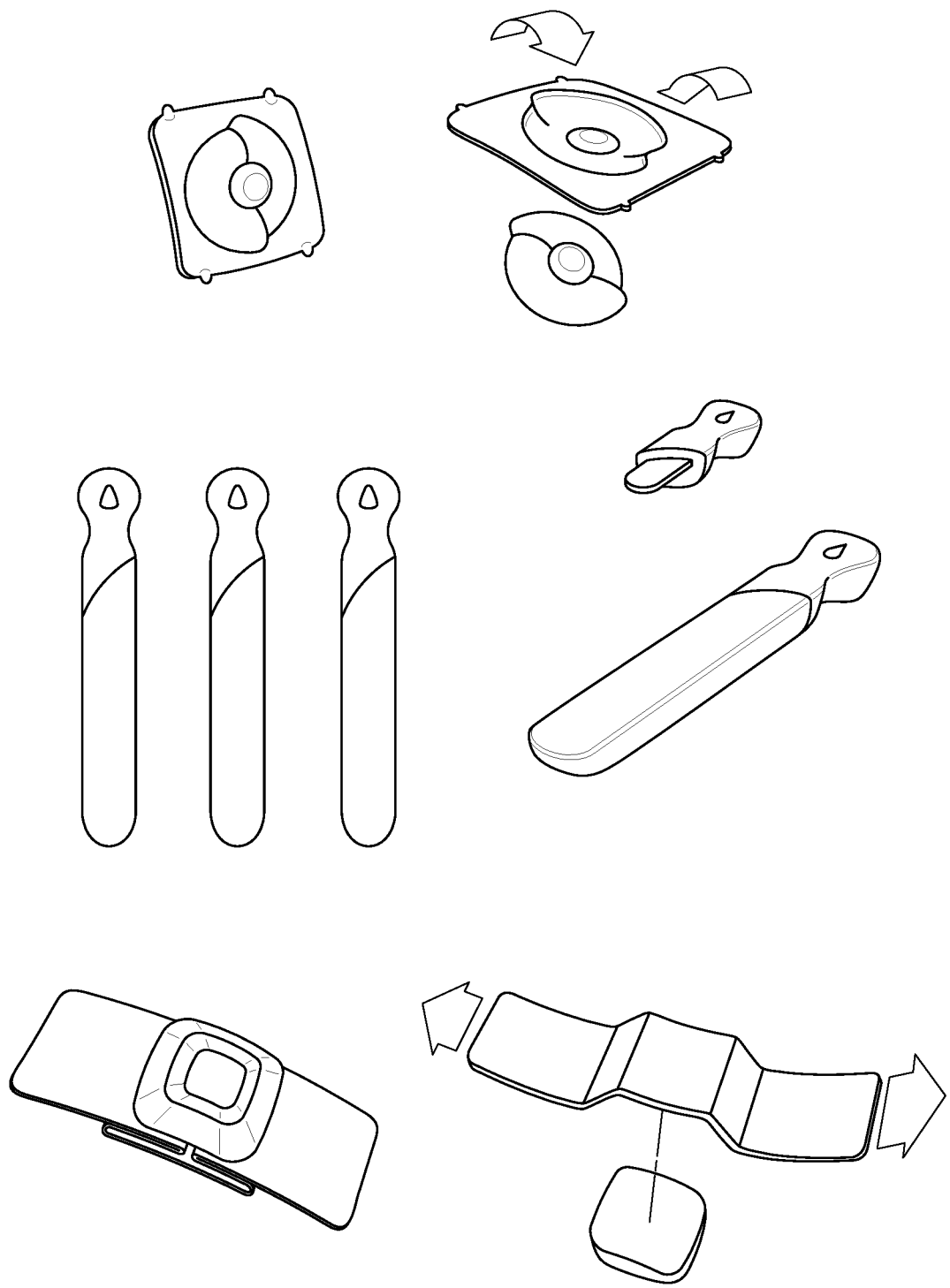
FIG. 4 provides examples of quick release forms of the structured unit dose dissolvable article.

The structured unit dose dissolvable article may also be packaged in a form for quick release that allows the user to avoid handling the bare article, for example, as shown in FIG. 4.

Figure 5:
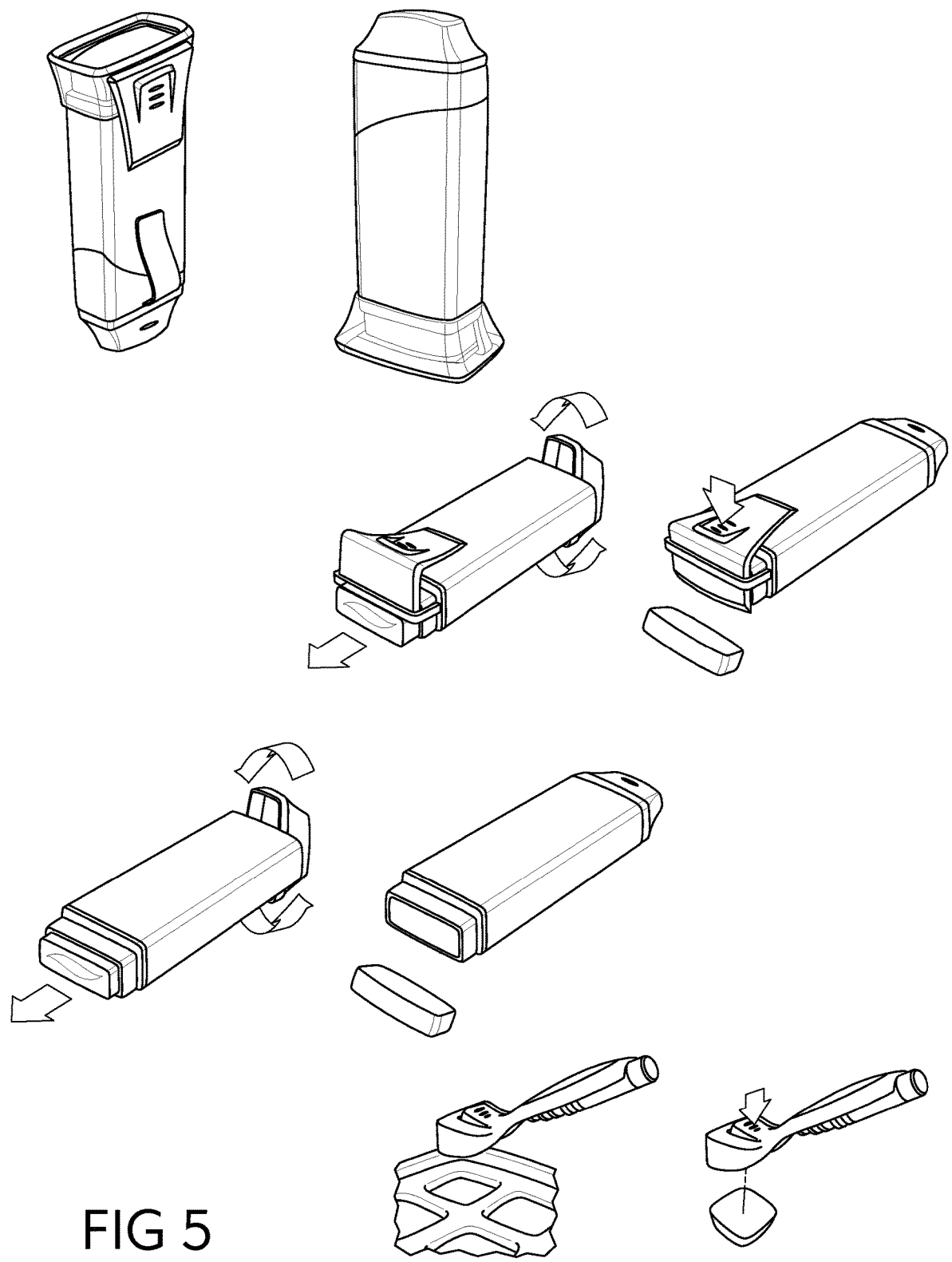
FIG. 5 provides a structured unit dissolvable article in the form of a twist and push dosing mechanism.

In an embodiment, the structured unit dissolvable article can be included with a dosing mechanism, such as, for example, a twist and push mechanism, examples of which can be seen in FIG. 5.

Figure 6:
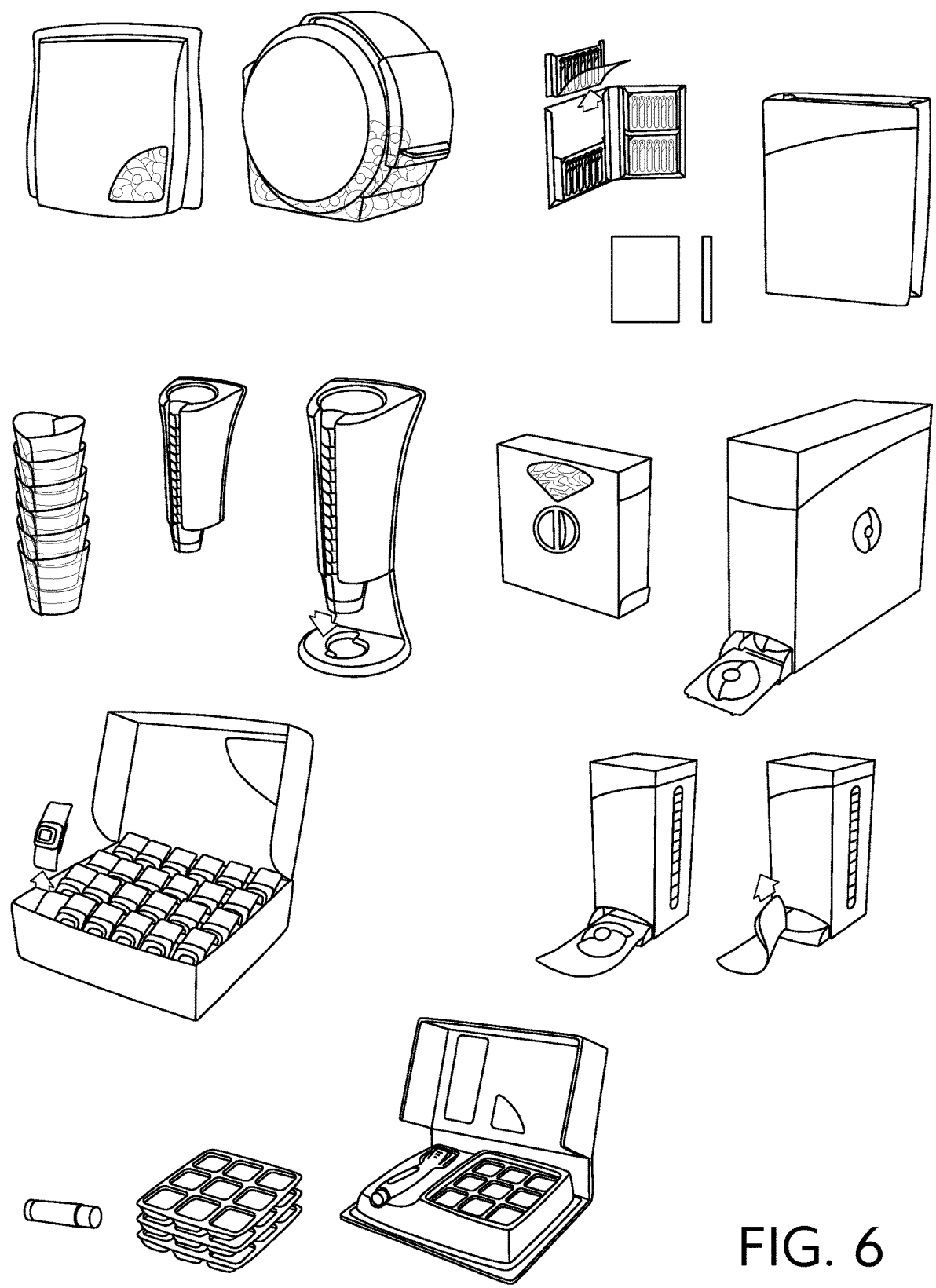
FIG. 6 provides example containers for structured unit dose dissolvable articles, such as a plastic tub, plastic bag or cardboard box.

In some embodiments, the structured unit dose dissolvable article may be contained in a container, such as a plastic tub, plastic bag or cardboard box, examples of which can be seen in FIG. 6.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

As used herein, the term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

Additionally, as used herein, the term "substantially" means that a value of a given quantity is within ±10% of the stated value. In other embodiments, the value is within ±5% of the stated value. In other embodiments, the value is within ±2.5% of the stated value. In other embodiments, the value is within ±1% of the stated value.

The invention herein is useful for providing a safe, effective and controllable unit does cleansing product, which may be better understood with reference to the following examples.

EXAMPLES

A number of typical detergent formulations were tested with varying polymers in an attempt to obtain structured unit dose tabs. The general procedure for preparing the tabs encompassed heating ingredients to make a fluid mixture with mixing. The heated mixture was then poured into a mold and allowed to sit to cool and take shape.

Initially, typical detergents having anionic surfactant and nonionic surfactant were tested with polymer additives (polyacrylates, Carbopol, HASE, clay (bentonite), natural gums) at a concentration of 2% to 9% by weight. The resulting compositions were very viscous but not a free-standing gel.

|  | Sample 1 wt % | Sample 2 wt % | Sample 3 wt % |
| --- | --- | --- | --- |
| Basic Cleansing Composition | | | |
| Neutralizer | 3.97 | 3.97 | 5.31 |
| Anionic Surfactant | 20 | 25 | 22.65 |
| Nonionic Surfactant | 10 | 10 | 9 |
| Structurant | | | |
| Polycarboxylate Polymer Additive | 1.5 | 1.5 | 2.3 |
| Lauric Acid | 5 | 5 | 4.5 |
| Palmitic Acid | 1 | 1 | 1 |
| Other Components | | | |
| Fragrance | 0.3 | 0.3 | 0.3 |
| pH Adjuster | 0.08 | 0.08 | 0.08 |
| Glycerine | 2 | 2 | 2 |
| Amidex CME | 0 | 3 | 3 |
| Water | 56.18 | 48.18 | 50.34 |
| Total | 100 | 100 | 100 |
| Appearance | clear | clear | opaque |
| pH | 8.1 | 8.1 | 8.3 |

The compositions did not form a gel which is free-standing by itself, but only a viscous liquid, although the viscosity of the composition is high.

An attempt was made to provide the necessary structure by adding a mixture of fatty acids to the formulation.

|  | Sample 4 wt % |
| --- | --- |
| Basic Cleansing Composition | |
| Neutralizer | 4.33 |
| Anionic Surfactant | 15 |
| Nonionic Surfactant | 10 |
| Structurant | |
| Polycarboxylate Polymer Additive | 1.5 |
| Lauric Acid | 7.2 |
| Myristic Acid | 2.52 |

-continued

| | Sample 4 wt % |
|---|---|
| Palmitic Acid | 1.15 |
| Stearic Acid | 0.86 |
| Other Components | |
| Fragrance | 0.3 |
| pH Adjuster | 0.08 |
| Glycerine | 15 |
| Water | 42.1 |
| Total | 100 |

The resultant formulation gave a transparent thick liquid.

The foregoing formulation was prepared again, and the polymer additive was changed to a combination of nonionic polyacrylate polymer derived from a combination of a $C_1$ to $C_{12}$ alkyl (meth)acrylate/hydroxyl C1 to C12 alkyl (meth)acrylate/ethoxylated C1 to C30 alkyl (meth)acrylate and a polyethylene glycol methyl glucose polymer having about 10-200 units derived from ethylene oxide.

| | Sample 5 wt % |
|---|---|
| Basic Cleaning composition | |
| Neutralizer | 2.93 |
| Anionic surfactant | 26.58 |
| Nonionic Surfactant | 6.78 |
| Structurant | |
| polycarboxylate polymer additive | 1.02 |
| nonionic polyacrylate derives* | 1.85 |
| Novethix HC220 | 2.00 |
| Lauric acid | 4.88 |
| Myristic acid | 1.71 |
| Palmitic acid | 0.78 |
| stearic acid | 0.58 |
| Other Components | |
| Fragrance capsules | 0.20 |
| Glycerine | 10.16 |
| Water | 40.48 |
| pH Adjuster | 0.05 |
| Total | 100.00 |

*nonionic polyacrylate derived from C1-12 alkyl (meth)acrylate/hydroxyl C1-12 alkyl (meth)acrylate/ethoxylated C1-30 alkyl (meth)acrylate The result was a wax-like substance, not fluid at RT.

Polyether such as polyethylene glycol, end capped polyether can help to bind the ingredient to avoid cracks in the tab and also help in dissolution. Therefore, water-soluble polyether is added into the compositions.

| | Sample 6 wt % | Sample 7 wt % | Sample 8 wt % |
|---|---|---|---|
| Basic Cleansing Composition | | | |
| Neutralizer | 1.19 | 1.03 | 3.045 |
| Anionic Surfactant | 12.75 | 11.70 | 22.73 |
| Nonionic Surfactant | 13.61 | 12.46 | 10.23 |
| Structurant | | | |
| 8000 Mw Poly(ethylene) glycol Polymer Additive | 0 | 5.5 | |
| 4000 Mw Poly(ethylene) glycol Polymer Additive | | | 10.23 |
| Palmitic Acid | 7.14 | 6.54 | |
| Coco fatty acid | | | 8.18 |
| Other Components | | | |
| Sorbitol (70%) | 9.52 | 8.72 | 10.23 |
| Solsperse 27000 | 7.14 | 6.54 | |
| Carbosperse K228 | 2.38 | 2.18 | |
| sodium citrate | 0 | 2.64 | |
| methyl blue | 0 | 0.37 | |
| Fragrance | | | 0.2 |
| Anti-Foam | | | 0.08 |
| Borax | | | 2.27 |
| Urea (hydrotrope/dispersant) | | | 13.64 |
| Water | qs | qs | Qs |
| Total | 100 | 100 | 100 |

Each Sample 6 to 8 formed wax tabs, although some melting occurred at 50° C.

However, with the addition of a polyether, particularly polyethylene glycol, based polyurethane alongside the polyethylene glycol polymer, the wax was observed to maintain its shape without melting.

| | | Sample 9 wt % |
|---|---|---|
| Basic Cleansing Composition | Neutralizer | 2.939 |
| | Anionic Surfactant | 21.94 |
| | Nonionic Surfactant | 9.87 |
| Structurant | 4000 Mw Poly(ethylene) glycol Polymer Additive | 9.87 |
| | Poly(ethylene) glycol based Polyurethane Polymer Additive | 3.5 |
| | Palmitic Acid | 7.14 |
| | Coco fatty acid | 7.99 |
| Other Components | Sorbitol | 9.91 |
| | Urea | 12.6 |
| | Fragrance | 0.2 |
| | Anti-Foam | 0.08 |
| | Borax | 2.19 |
| | Water | 11.77 |
| Total | | 100 |

Further samples were made with polyethylene glycol polymer and a polyethylene glycol methyl glucose polymer having about 120 units derived from ethylene oxide. All the formulations in the tables below formed high temperature stable structured unit doses.

TABLE A

| Ingredient | 10 wt % | 11 wt % | 12 wt % | 13 wt % | 14 wt % |
|---|---|---|---|---|---|
| Basic cleasing composition | | | | | |
| Neutralizer | 4.97 | 6.09 | 4.97 | 4.97 | 4.97 |
| Anionic surfactant | 16.41 | 19.34 | 16.41 | 16.41 | 16.41 |
| Nonionic surfactant | 15.32 | 7.03 | 15.32 | 15.32 | 15.32 |
| Structurant | 0.00 | 0.00 | 0.00 | 0.00 | 0.00 |
| 4000 Mw Poly(ethylene) glycol Polymer Additive | 5.53 | 5.47 | 9.09 | 0.00 | 0.00 |

TABLE A-continued

| Ingredient | 10 wt % | 11 wt % | 12 wt % | 13 wt % | 14 wt % |
|---|---|---|---|---|---|
| 8000 Mw Poly(ethylene) glycol Polymer Additive | 0.00 | 0.00 | 0.00 | 5.53 | 0.00 |
| polyethylene glycol methyl glucose polymer having about 10-200 units derived from ethylene oxide | 3.00 | 2.96 | 3.00 | 3.00 | 8.53 |
| Coco fatty acid-hydrogenated | 15.32 | 19.34 | 15.32 | 15.32 | 15.32 |
| Oleic Acid | 0.00 | 0.00 | 0.00 | 0.00 | 0.00 |
| Myristic Acid | 0.00 | 0.00 | 0.00 | 0.00 | 0.00 |
| Lauric Acid | 0.00 | 0.00 | 0.00 | 0.00 | 0.00 |
| Other components | 0.00 | 0.00 | 0.00 | 0.00 | 0.00 |
| Sorbitol (70%) | 2.98 | 2.94 | 2.98 | 2.98 | 2.98 |
| Na Xylene sulfonate (40%) | 0.43 | 0.00 | 0.43 | 0.43 | 0.43 |
| Anti-foam (AF8014) | 0.09 | 0.09 | 0.09 | 0.09 | 0.09 |
| glycerine | 4.05 | 4.00 | 4.05 | 4.05 | 4.05 |
| Urea | 10.86 | 10.73 | 10.86 | 10.86 | 10.86 |
| Fragrance capsules* | 0.00 | 0.00 | 0.00 | 0.00 | 0.00 |
| Water | 21.06 | 22.00 | 17.51 | 21.06 | 21.06 |
| Total | 100 | 100 | 100 | 100 | 100 |
| Appearance | gel | gel | gel | gel | gel |

| Ingredient | 21 wt % |
|---|---|
| Basic Cleansing Composition | |
| Neutralizer | 9.64 |
| Anionic surfactant | 15.91 |
| Nonionic surfactant | 14.85 |
| Structurant | |
| 4000 Mw Poly(ethylene) glycol Polymer Additive | 5.36 |
| Coco fatty acid-hydrogenated | 14.85 |
| polyethylene glycol methyl glucose polymer having about 10-200 units derived from ethylene oxide | 2.90 |
| Other Components | |
| Sorbitol (70%) | 2.89 |
| Na Xylene sulfonate (40%) | 0.41 |
| Anti-foam (AF8014) | 0.09 |
| glycerin | 3.92 |
| Urea | 10.53 |
| Enzymes | 2.00 |
| Fragrance | 0.50 |
| Water | 15.60 |
| Minors | Qs |
| Total | 100.00 |

TABLE B

| Ingredient | 15 wt % | 16 wt % | 17 wt % | 18 wt % | 19 wt % | 20 wt % |
|---|---|---|---|---|---|---|
| Basic cleasing composition | | | | | | |
| Neutralizer | 4.88 | 5.20 | 4.87 | 4.30 | 4.17 | 4.97 |
| Anionic surfactant | 16.41 | 16.29 | 16.42 | 18.07 | 21.66 | 16.41 |
| Nonionic surfactant | 15.32 | 15.21 | 15.32 | 15.21 | 15.26 | 15.32 |
| Structurant | 0.00 | 0.00 | 0.00 | 0.00 | 0.00 | 0.00 |
| 4000 Mw Poly(ethylene) glycol Polymer Additive | 5.53 | 5.49 | 5.53 | 5.49 | 5.51 | 5.53 |
| 8000 Mw Poly(ethylene) glycol Polymer Additive | 0.00 | 0.00 | 0.00 | 0.00 | 0.00 | 0.00 |
| polyethylene glycol methyl glucose polymer having about 10-200 units derived from ethylene oxide | 3.00 | 2.97 | 3.00 | 2.98 | 2.98 | 3.00 |
| Coco fatty acid-hydrogenated | 13.02 | 0.00 | 0.00 | 0.00 | 0.00 | 15.32 |
| Oleic Acid | 2.29 | 0.00 | 0.00 | 0.00 | 0.00 | 0.00 |
| Myristic Acid | 0.00 | 0.00 | 15.32 | 10.80 | 7.29 | 0.00 |
| Lauric Acid | 0.00 | 15.21 | 0.00 | 0.00 | 0.00 | 0.00 |
| Other components | 0.00 | 0.00 | 0.00 | 0.00 | 0.00 | 0.00 |
| Sorbitol (70%) | 2.98 | 2.96 | 2.98 | 2.96 | 2.97 | 2.98 |
| Na Xylene sulfonate (40%) | 0.43 | 0.42 | 0.43 | 0.42 | 0.43 | 0.43 |
| Anti-foam (AF8014) | 0.09 | 0.09 | 0.09 | 0.09 | 0.09 | 0.09 |
| glycerine | 4.05 | 4.02 | 4.05 | 4.02 | 4.03 | 4.04 |
| Urea | 10.86 | 10.78 | 10.86 | 10.78 | 10.81 | 10.85 |
| Fragrance capsules* | 0.00 | 0.00 | 0.00 | 0.00 | 0.00 | 0.00 |
| Water | 21.15 | 21.36 | 21.14 | 24.88 | 24.80 | 21.06 |
| Total | 100 | 100 | 100 | 100 | 100 | 100 |
| Appearance | gel | gel | gel | gel | gel | Gel |

The detergency of the structured unit dose dissolvable article was performed by use of a Tergotometer under the following conditions:
 water hardness—150 ppm with $Ca^{2+}/Mg^{2+}=2/1$ mol/mol,
 washing temperature was 25° C.,
 washing time was 20 min, and
 rinse time was 5 min at room temperature.
The concentration of product was 0.2%, i.e., 2 g/L.
3 replicate runs were carried out for each stain.
The structured unit dose dissolvable article had the composition listed in the table below.

The test soiled swatches are summarized below.

| Soiled swatches | Description |
|---|---|
| Swatch 1 | Cott-carbon black/olive oil |
| Swatch 2 | PE/cott-carbon black/olive oil |
| Swatch 3 | Cott-IEC carbon black/mineral oil |
| Swatch 4 | Cott-sebum/pigment |
| Swatch 5 | Cott-blood/milk/ink |
| Swatch 6 | PE/cott-blood/milk/ink |
| Swatch 7 | Cott-400-grass |

The gel tab was tested along with one premium commercial product on the market. The "Delta E" of the swatches is measured using a HunterLab Lab scan XE optical device. The Delta E value represents a difference in color between a soiled swatch and a reference swatch, and is calculated by the following formula, which employs "L," "a" and "b" values automatically generated by the HunterLab Labscan equipment.

$$\text{Delta E} = [(L_{sample} - L_{standard})^2 + (a_{sample} - a_{standard})^2 + (b_{sample} - b_{standard})^2]^{1/2}$$

Reading the color difference with the optical equipment gives a more accurate measurement than relying on visual observations. The results are summarized below.

TABLE

The delta E values of the soiled fabric swatches after washing

| Product | Swatch 1 | Swatch 2 | Swatch 3 | Swatch 4 | Swatch 5 | Swatch 6 | Swatch 7 |
|---|---|---|---|---|---|---|---|
| Gel tab | 9.95 | 13.94 | 6.89 | 12.1 | 16.88 | 32.72 | 17.1 |
| Premium product | 11.45 | 15.69 | 9.39 | 14.47 | 17.22 | 32.54 | 22.92 |

The anti redepostion properties of the structured unit dose dissolvable article of Sample 21 also were tested by use of a Tergotometer under the following conditions:
water hardness—300 ppm with $Ca^{2+}/Mg^{2+}=3/2$ mol/mol,
washing temperature was 100° F.,
washing time was 15 min, and
rinse time was 5 min at room temperature.
The concentration of product was 0.2%, i.e., 2 g/L.
Added soil is carbon black Monarch 120 at 0.01%.
Multicycle runs were carried out in the presence of soils for the test.
The test fabric swatches are cotton substrate and shown below.

| Tested fabric | Description |
|---|---|
| Cotton 400 | Cotton (washed) |

The gel tab of Sample 21, as well as a gel tab of Sample 21 without an enzyme, labeled Sample 22, were tested alongside one premium commercial product on the market. The results are summarized below. Here, the lower the delta E value, the higher the anti redeposition properties. A lower delta E value indicates a less degree of soil redeposition onto the tested fabrics.

TABLE

The delta E values of the clean fabric swatches after multi cycle washing

| wash cycle | Sample 21 | Sample 22 | Premium product |
|---|---|---|---|
| 1 | 2.20 | 2.63 | 1.97 |
| 2 | 4.22 | 5.18 | 5.30 |
| 3 | 6.1 | 7.11 | 7.72 |
| 4 | 8.8 | 9.3 | 10.16 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A structured unit dose dissolvable article comprising a. a cleansing composition, and b. a structurant composition comprising:
   i. a $C_6$ to $C_{30}$ fatty acid or mixtures thereof, and
   ii. at least one water soluble or water dispersible polymer selected from:
      1. ethylene oxide-propylene oxide-butylene oxide block copolymer,
      2. polyethylene glycol methyl glucose polymer having from 2 to 1000 units derived from ethylene oxide, and
      3. polyethylene glycol based polyurethane.

2. The structured unit dose dissolvable article of claim 1, where the fatty acid is at least one of oleic acid, decanoic acid, caprylic acid, lauric acid, myristic acid, palmitic acid, stearic acid, or combinations thereof.

3. The structured unit dose dissolvable article of claim 1, where the polyurethane additionally include units derived from, polyester polyol, polyether polyol, polycaprolactone diol, polybutadiene polyol and their mixtures; and end-capped polyurethanes.

4. The structured unit dose dissolvable article of claim 1, where the cleansing composition comprises a linear or branched alkylbenzene sulfonic acid, alkyl sulfate, alkylethersulfate, alpha-olefin sulfonates, and combinations thereof.

5. The structured unit dose dissolvable article of claim 1, where the cleansing composition comprises nonionic surfactants.

6. The structured unit dose dissolvable article of claim 1, where the cleansing composition comprises an alkali hydroxide, amines, alkanolamines, and their mixtures.

7. The structured unit dose dissolvable article of claim 1, further comprising hydrotropes.

* * * * *